United States Patent [19]

Freese

[11] 4,174,732
[45] Nov. 20, 1979

[54] FLOW SENSING VALVE FOR PROTECTING CONDUIT SYSTEMS AGAINST UNINTENTIONAL PRESSURE CHANGES

[75] Inventor: Lennart W. Freese, Järfälla, Sweden

[73] Assignee: SMT-Pullmax AB, Gothenburg, Sweden

[21] Appl. No.: 870,007

[22] Filed: Jan. 16, 1978

[30] Foreign Application Priority Data

Jan. 17, 1977 [SE] Sweden ............................ 7700415

[51] Int. Cl.² ............................................... F16K 17/32
[52] U.S. Cl. ................................................... 137/498
[58] Field of Search ................................. 137/460, 498

[56] References Cited

FOREIGN PATENT DOCUMENTS 570621 1/1924 France ................................. 137/498

Primary Examiner—Robert G. Nilson
Attorney, Agent, or Firm—Blanchard, Flynn, Thiel, Boutell & Tanis

[57] ABSTRACT

A valve arrangement for automatically stopping the flow through a conduit section on the occurrence of a rupture or leak in the section, the arrangement comprising a closing or blocking valve including a movable closure device mounted at the inlet of the conduit section. The valve is normally open and offers the medium flowing therethrough a resistance resulting in a first pressure drop across the valve in response to the size of the flow. This first pressure drop is arranged to actuate the closure device to thereby close same. A flow sensing device is mounted at the outlet of the conduit section, and an orifice plate or venturi constriction is located between the inlet and outlet sides thereof, so that the medium flowing therethrough generates a second pressure drop in response to the size of the flow, this latter pressure drop being arranged to actuate the closure device in an opening direction. The closure device includes two parts, each movable in relation to the other and actuated by the pressure drops, the first part comprising a blocking body arranged for moving toward a closed position by the first pressure drop to thereby block the flow through the valve when in the closed position, and the second part comprising a servo body arranged for actuation by the second pressure drop to thereby in turn act on the blocking body to counteract its movement toward the closed position.

6 Claims, 8 Drawing Figures

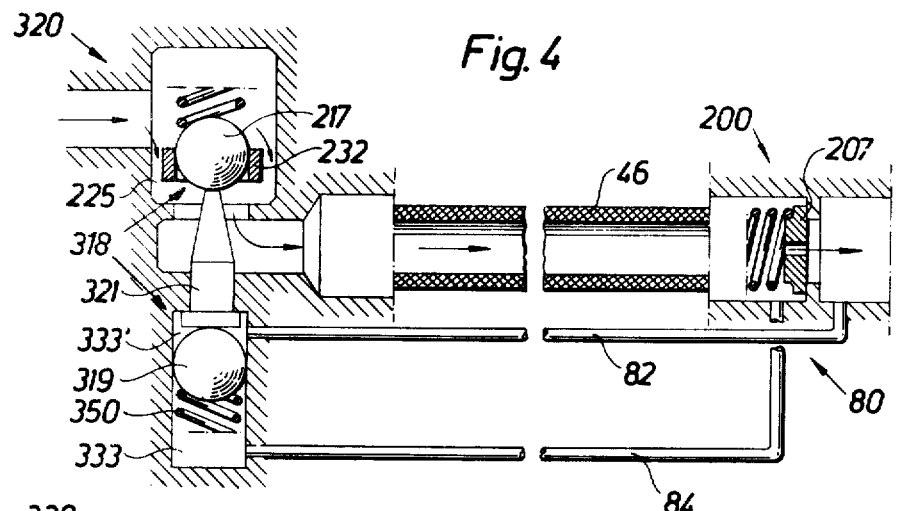
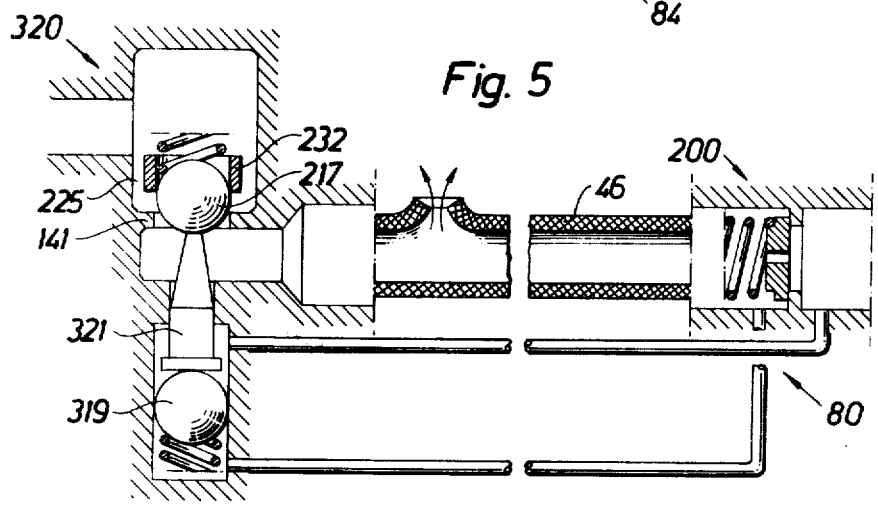
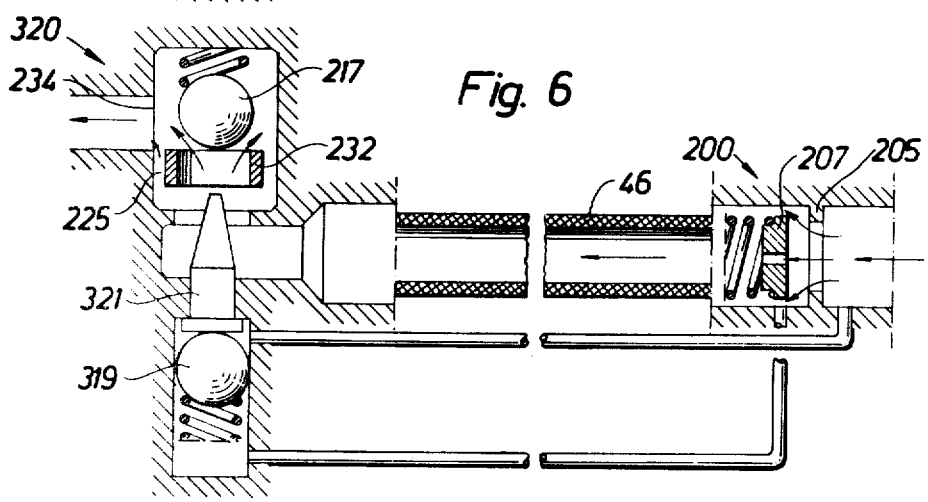

FLOW SENSING VALVE FOR PROTECTING CONDUIT SYSTEMS AGAINST UNINTENTIONAL PRESSURE CHANGES

BACKGROUND OF THE INVENTION

The present invention relates to protective devices for liquid and gas conducting systems, such as hydraulic systems, especially to so-called hose rupture valves, the invention relating to an improvement on the valve arrangement described in U.S. Pat. No. 4,004,607.

In this patent there is described a valve arrangement for protecting a conduit system against unintentional pressure variations, such as occur when the hose or conduit is ruptured, the arrangement being introduced into especially exposed conduit sections in the system, e.g. a flexible hose incorporated therein. The valve arrangement comprises a blocking valve arranged at the inlet of the conduit section, this valve being kept open during normal operation, and a flow-sensing means arranged at the outlet of the conduit section, of the pressure drop type, e.g. an orifice plate or venturi constriction. The flowing medium produces a pressure drop, in a normal way, across the flow sensing means, and via an auxiliary or pilot conduit the pressure drop is transferred to the inlet of the conduit section, to be there compared with the pressure drop which the flowing medium causes over the valve itself. As long as the relationship between both pressure drops is kept at a generally constant, predetermined value, i.e. as long as the volume flow through the sensing means is the same as through the blocking valve, the latter is kept open. However, if a rupture or leak occurs in the monitored conduit section, the volume flow through the sensing means lessens which is reflected by the pressure drop across it becoming less. The relationship between both pressure drops will thus no longer be the same, and the deviation from the constant value is registered by a pressure-comparing valve means, arranged to cause immediate closure of the blocking valve if the deviation exceeds a predetermined value. In the preferred case the pressure-comparing valve means consists of the blocking valve member itself, which is formed as a slide, movable between an open position and a closed position. The pressure drop or differential pressure across the orifice plate or venturi constriction is hereby arranged to actuate the slide in one direction while the pressure drop or differential pressure across the blocking valve which drop, in fact, appears across the slide itself, is caused to actuate the slide in a reverse direction, the arrangement being such that the slide is urged towards closure and blocks the flow through the valve if the said alteration in the pressure drop ratio occurs.

This known valve arrangement is extremely reliable operationally and functions with high selectivity, i.e. it reacts only for rupture and leaks, not for flow surges or pressure waves occurring during normal operation. Practical experience has however shown that improvements are desirable in especially two respects. In the first place, the valve arrangement should give as little flow resistance as possible for a flow in the reverse direction, i.e. flow from the outlet to the inlet of the monitored section, a relationship which is of importance in the use of the valve arrangement on hydraulic working machines, e.g. excavating machines. In the second place there is the general desire to reduce the dimensions of the apparatus and to simplify the components thereof.

The invention thus has the object of providing a valve arrangement of the kind in question which satisfies the desires mentioned above. This is achieved, and a valve arrangement especially suitable as a hose rupture valve or holding valve is provided by the apparatus according to the invention being given the characterizing features disclosed in the claims.

BRIEF DESCRIPTION OF THE DRAWINGS

The invention will now be described in greater detail while referring to the attached drawing, in which:

FIG. 4 schematically shows a third still more simplified embodiment of the invention, and FIGS. 5 and 6 illustrate the method of its operation.

DETAILED DESCRIPTION

Figure 1:
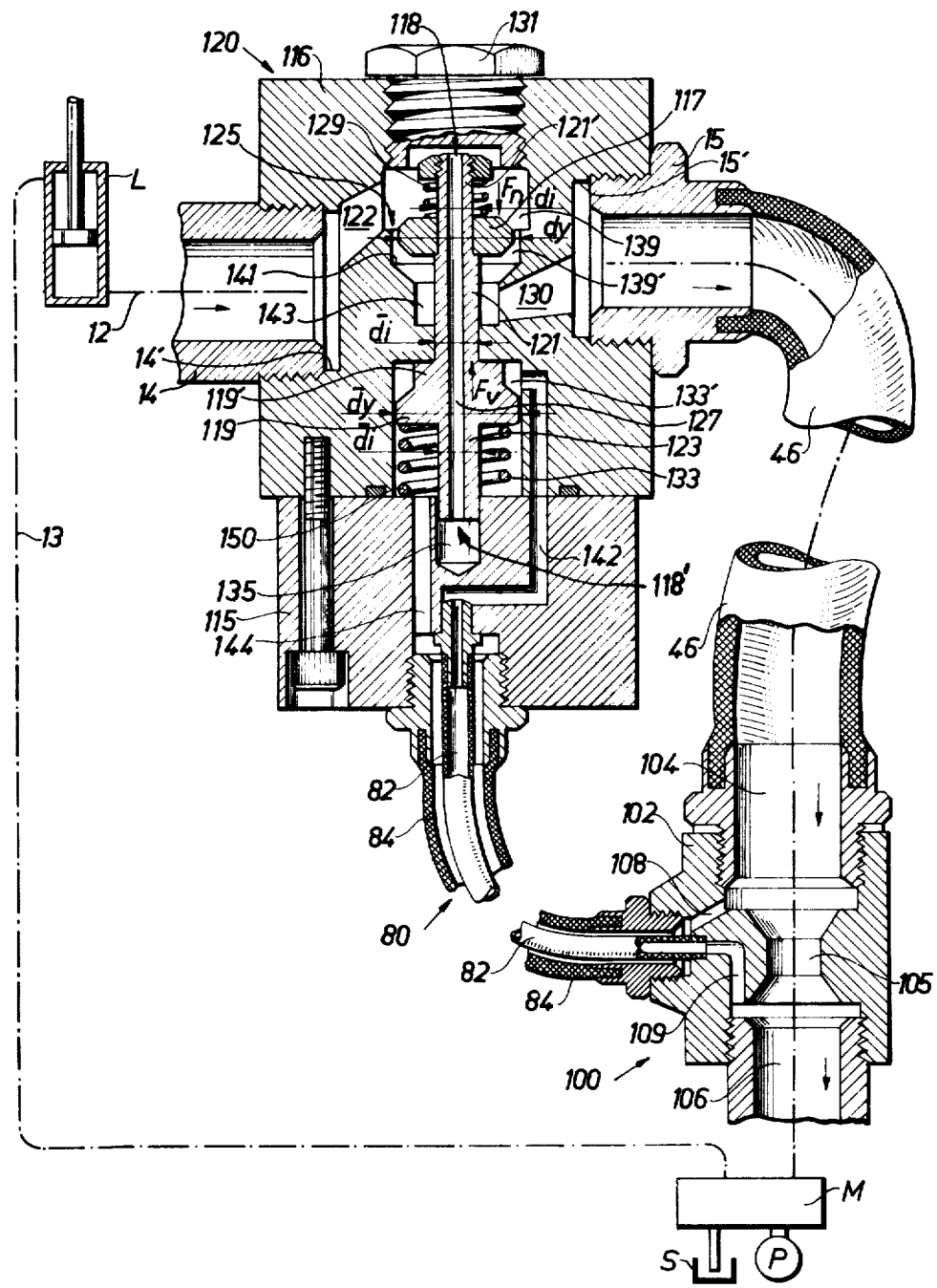
FIG. 1 is a schematic illustration of a valve means according to the invention.

Similar to the known valve means mentioned in the introduction, the present valve means comprises a blocking valve 120, shown in FIG. 1, and a flow sensing means 100, respectively arranged at the inlet to and outlet from a monitored conduit section, e.g. a hose 46. In this case the blocking valve consists of a valve housing 116 with a cover 115, inlet and outlet ports 14' and 15' with stubs or nipples 14 and 15 respectively, and a valve body in the shape of a closure means which in its entirety has been given the denotation 118 and comprises a piston slide 118' carrying a movable valve body 117. The valve slide is slidably accommodated in a cylindrical shouldered bore in the housing 116 and the cover 115, the bore being generally at right angles to the outlet and inlet. As is apparent, the bore is closed off upwardly by a plug 131 screwed into the housing 116. The piston slide 118' is normally kept in an upper end position, as viewed in the figure, by a light compression spring 150, and the closure means thereby allows flow through the valve, although the flow is somewhat constricted as is apparent from the following.

From FIG. 1 it will be seen that the piston slide 118' comprises a lower piston portion 119 of diamter $d_y$ and which is accommodated in a lower chamber 133 formed in the valve housing 116. From the piston portion 119 there extend coaxial upward and downward spindles 121 and 123, respectively, with the same diameter $d_i$, the lower spindle 123 being guided in a bore 135 in the valve housing cover 115, while the upper spindle 121 passes through a guide in the housing above the chamber 133. The upper end of the spindle 121 is made with a somewhat reduced diameter $d_i$ so that a portion 121' is formed on which the valve body 117, with an outside diameter $d_y$, is slidably arranged. By a light compression spring 129 the valve body 117 is normally kept in abutment against the shoulder formed between the spindle portions 121 and 121' as is clearly apparent from FIG. 1. Upwardly, the piston portion 119 merges into a portion 119' with reduced diameter and this is surrounded by an upper portion 133' of the chamber 133. The closure means 118 is in its entirety kept by the spring 150 in an upper end position or inactive position, in which the portion 119' of the piston slide 118' abuts against the roof of the chamber portion 133'. For pressure equalizing purposes, the piston slide 118' is provided with a coaxial through duct 127, so that it can move without being hindered by the pressure medium trapped in the bore bottom 135.

The valve body 117 is accommodated in an inlet chamber 139 which downwardly merges into a portion 139' with a reduced diameter, to form an annular space 125 between the valve body and the surrounding wall of the chamber portion 139'. The inlet chamber 139 is in communication via a passage 122 with the inlet port 14' of the valve. The inlet chamber portion 139' merges, via a conical valve seat 141 coacting with the valve body 117, into an outlet chamber 143, in its turn communicating with the outlet port 15' of the valve via an outlet passage 130.

It may be said generally that the closure means 118 of the blocking valve has two moving parts, of which one, the valve body 117, constitutes a blocking body which can block off the flow through the valve while the other, the piston slide 118', constitutes a servo body coacting with the blocking body in a manner apparent from the following.

The flow sensor 100 is in this case completely identical with that included in the valve arrangement according to the patent mentioned in the introduction, and thus includes a venturi constriction 105 for creating a pressure signal in a manner known per se, related to the passing flow. The flow sensor comprises a housing 102 having a through passage with an inlet 104 and outlet 106, between which the constriction 105 is arranged. The pressure in the inlet 104, i.e. on the inlet side of the constriction 105, is sensed via a duct 108 in the housing 102, while the pressure in the outlet 106 is sensed via a duct 109. The flow sensor 100 is in communication with the blocking valve 120 by means of a dual hose 80 consisting of an inner hose 82 inside an outer hose 84, the inner hose 82 being connected to the duct 109 and the outer hose 84 to the duct 108. The pressure difference occurring between the inlet and outlet side of the venturi constriction 105 is thus transferred via the hoses 84 and 82 to the blocking valve 120, namely by the hose 84 communicating with the lower valve chamber 133 under the piston portion 119 of the piston slide 118', via a duct 144 in the valve housing cover 115, and the hose 82 communicating with the chamber 133' around the piston portion 119', via a duct 142.

As is schematically shown in FIG. 1, the inlet port 14' of the blocking valve 120 is in communication with a hydraulic working cylinder L via a pipe 12, the cylinder being incorporated in a hydraulic loader or excavator, for example, so that the valve is connected to the end of the cylinder from which pressure medium is forced when lowering the implement on the machine. The other end of the cylinder, with its connection thus forming an inlet when lowering, communicates with an operating valve M for the system, via a return pipe 13. Said valve is also in communication with the outlet 106 from the flow sensor 100, and consequently with the outlet 106 from the monitored conduit section i.e. the hose 46 in this case.

The mode of operation for the valve arrangement will now be described while referring to FIGS. 1 and 2, of which the latter is a schematic illustration of an appropriate part of the hydraulic system in question, which includes the monitored hose 46 with the blocking valve 120 at its inlet and the flow sensor 100 at its outlet.

Figure 2:
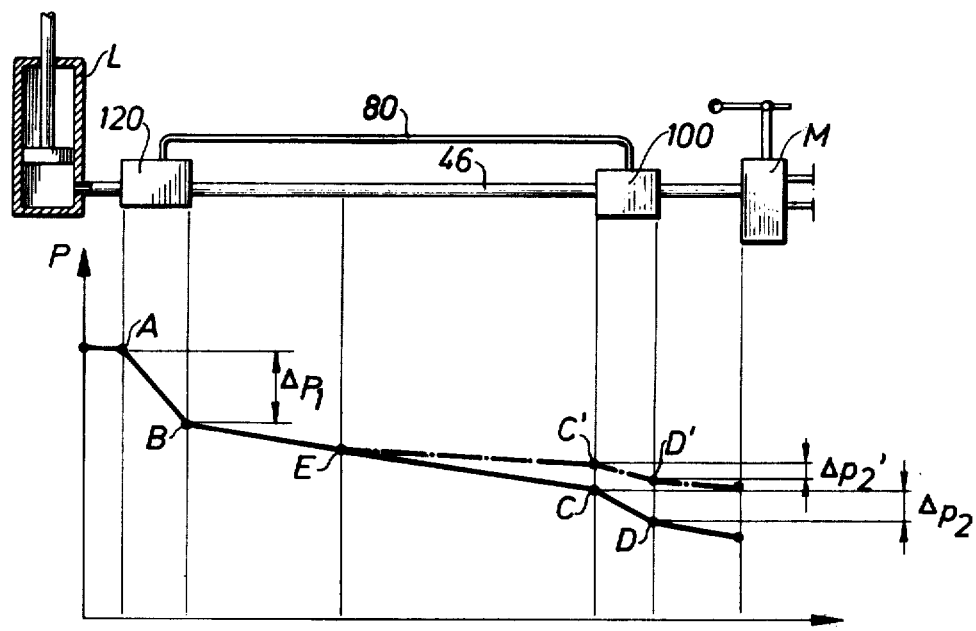
FIG. 2 is a pressure diagram demonstrating the pressure relationships within a conduit section monitored by the valve means.

The diagram in the lower part of FIG. 2 illustrates the pressure relationships in this part of the system.

For the example shown in FIG. 1 and as already mentioned, the closure means 118 assumes its upper position during normal conditions, to allow a somewhat constricted flow in the direction of the arrows shown in the figure, with the flow corresponding to a lowering movement of the cylinder L. The hydraulic medium thereby flows from the inlet 14, 14' via the passage 122 and the inlet chamber 139 through the annular space 125 to the outlet chamber 143 and further through the outlet passage 130 to the outlet 15, 15'. Through the constriction of the flow taking place in the space or gap 125, there is a pressure drop along said gap so that the pressure in the chamber 139, corresponding to the point A in the pressure diagram according to FIG. 2, is higher than in the chamber 139' under the valve body, said pressure being denoted by the point B in the diagram. The pressure drop in question is denoted $\Delta p_1$, and this obviously creates a downwardly directed force $F_h$ on the valve body 117 and thereby on the closure means 118 as a whole, of the magnitude $$F_h = \Delta p_1 \frac{\pi(d_y^2 - d_i^2)}{4} = \Delta p_1 \cdot A_1$$

where $A_1$ = the net or active area of the valve body 117.

There is simultaneously a pressure drop $\Delta p_2$ in the flow sensor 100, whereat the higher pressure, represented by the point C in FIG. 2, is transmitted from the inlet side 104 via the duct 108, the outer hose 84 of the pilot line 80 and the duct 144 to the chamber 133 under the piston portion 119, while the lower pressure, denoted by D in FIG. 2, is transmitted from the outlet side 106, via the duct 109, the inner hose 82 of the pilot line and the duct 142 to the chamber 133' around the piston portion 119'. The pressure difference between chambers 133 and 133', thus equal to $\Delta p_2$, gives rise to an upwardly directed force $F_v$ acting on the piston portions and thereby the closure means 118 taken as a whole of the magnitude $$F_v = \Delta p_2 \frac{\pi(d_y'^2 - d_i'^2)}{4} = \Delta p_2 \cdot A_2$$

where $A_2$ = the active area of the piston portions 119, 119'.

The condition for the valve remaining open is thus that $F_v > F_h$, i.e. that $$\Delta p_2 \cdot A_2 > \Delta p_1 \cdot A_1, \text{ or } \frac{\Delta p_2}{\Delta p_1} > \frac{A_1}{A_2}$$

neglecting the action of the retaining spring 150.

If the venturi constriction 105 of the flow sensor 100 is now dimensioned so that this condition is met for a certain flow from the cylinder L via the valve 120, it will thus remain open for other flows also, since the ratio of $\Delta p_2$ to $\Delta p_1$ is independent of the absolute size of the flow. $F_v$ is thus always greater than $F_h$ as long as the hose 46 is intact.

On the other hand, if a considerable leakage occurs in the hose 46, e.g. at a point E according to FIG. 2, in the conditions described, i.e. the flow through the flow sensor 100 is reduced in relation to the flow through the valve 120 while the cylinder L is carrying out a lowering movement, the pressure graph will change as is illustrated by the line A-B-E-C'-D' in FIG. 2. The pressure drop in the flow sensor falls to $\Delta p'_2$, i.e. the upwardly directed force $F_v$ on the closure means 118 is reduced to $$F_v' = \Delta p_2' \cdot A_2 < F_h$$

whereat the closure means begins to move downward, as viewed in the drawing. This movement accelerates rapidly, resulting in that the valve body 117 makes sealing contact with the valve seat 141 below it, and the flow through the valve from the cylinder L is blocked. The same will naturally occur if the hose 46 ruptures or works loose from one of its points of attachment, the flow through the flow sensor 100 thus entirely ceasing and making $\Delta p'_2 = 0$.

For a flow in the opposite direction, i.e. when the cylinder L carries out a lifting movement, the signs of the pressure drops occurring in the blocking valve 120 and the flow sensor 100 are reversed. This means that the pressure will be higher in the chamber 139' than in the chamber 139, and the valve body 117 will be subjected to an upwardly directed force. The valve body is therefore displaced upwardly against the bias of the light spring 129, communication between chambers 139' and 139 then being practically without constriction thus causing the pressure drop over the valve to be considerably lower when there is a flow in this direction than in the opposite direction when the cylinder L carries out a lowering movement. This is a considerable advantage, since constriction losses during lifting signify reduced working capacity and increased heat generation in the hydraulic system. On the other hand, the ability of the valve to react quickly for a conduit rupture is not affected by its facilitating the flow in the lifting direction in this way. If there is a rupture in the hose 46 during a lifting movement, this naturally means that in the first place the hydraulic liquid no longer flows into the cylinder L through the pipe 12, but rushes out through the rupture. The raised valve body 117 does not only move downwards immediately under the actuation of the spring 129 and the flowing medium, but continues to move together with the piston slide 118' until the underside of the body reaches its seat 141 and blocks off further communication, since the downward force $F_h$ caused by the pressure drop $\Delta p_1$ is now generally prevailing (the counteracting pressure drop $\Delta p_2$ over the flow sensor 100 is now $\Delta p'_2 = 0$) and the implement or operating arm is prevented from falling.

Figures 3, 3A, 3B:
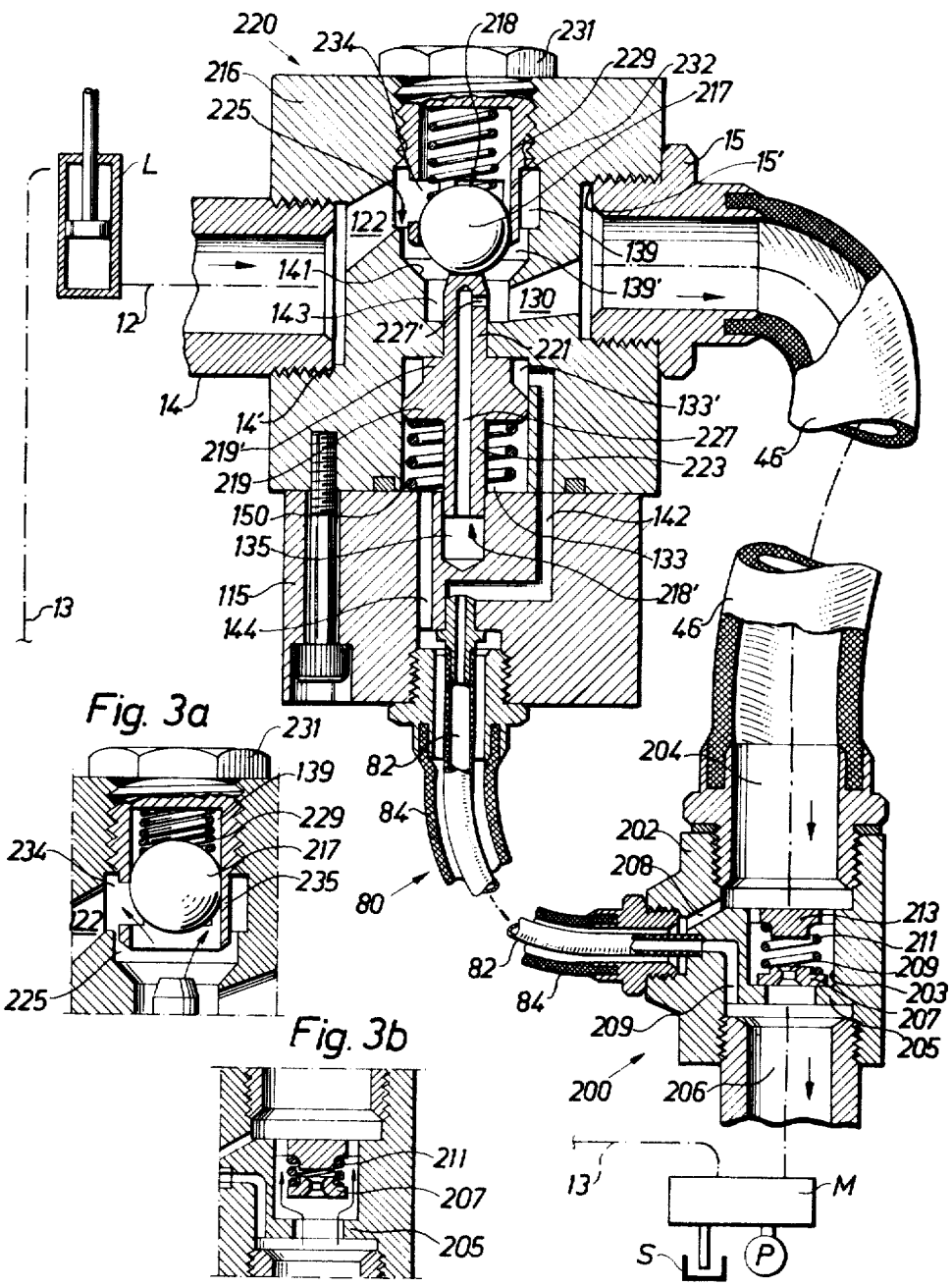
FIG. 3 shows a second simplified embodiment of the valve means according to the invention.
FIGS. 3a and 3b are detail views of this embodiment.

In FIG. 3 there is shown an embodiment of the valve arrangement according to the invention, which is modified in relation to the embodiment shown in FIG. 1, and is preferred in practice. The arrangement according to FIG. 3 agrees in principle with that shown in FIG. 1, and thus a monitored conduit section or a hose 46 is connected at its inlet to a blocking valve 220 and at its outlet to a flow sensor 200, this sensor and the blocking valve being in communication with each other via the pilot hose 80, similar to the previous embodiment. The blocking valve 220' is also similar in its construction to the valve 120 shown in FIG. 1, and details common to both valves have been given the same reference numerals in FIG. 3 as in FIG. 1. The modification in relation to the previous blocking valve 120 lies in the fact that its closure means 118 with the valve body 117 has been replaced by a closure means 218 consisting of a separate piston slide 218' coacting with a valve body 217 of a suitable form, separated from the slide, preferably a valve ball made from steel. The piston slide 218' now consists of a piston 219, 219', accomodated in the lower chamber 133 of the valve housing 216 and upwardly and downwardly directed spindles 221 and 223 extend coaxially from the piston 219, 219'. The spindles have the same diameter and are guided in the housing in the same way as the corresponding spindles 121 and 123 in the previous embodiment. As before, the piston slide 218' is kept in an upper position or rest position by a spring 150. The length of the upper spindle 121 is so adjusted that in this position it keeps the valve ball 217 raised and out of the way of the valve seat 141 beneath it, said seat being arranged to coact with the ball 217 in a way to be described in the following. For pressure equilization, the piston slide 218' is in this case provided with a central duct 227 which is not throughgoing, but extends from the bottom bore 135 up to a short radial duct 227', which opens out into the outlet chamber 143.

As is apparent from FIG. 3, the valve ball 217 is displacably mounted in a guide formed by a dependent portion of the plug 231 which upwardly closes off the lateral bore in the valve housing 216. The guide consists of a sleeve 232 dependent from the plug 231 and extending through the inlet chamber 139 and into the lower portion 139' thereof with a smaller diameter so that an annular space or gap 225, corresponding to the gap 125 in FIG. 1, is formed between the wall of the chamber 139' and the outside of the sleeve 232. The ball 217 is easily movable of the chamber 139' and is easily movable in its guide formed by the sleeve 232 and is kept by a light compression spring 229 in engagement with the upper end of the upper spindle 221 of the piston slide 218', as shown in FIG. 3. There are openings or windows 234 in the part of the sleeve 232 which is in the inlet chamber 139 so that when the ball 217 is lifted up in its guide against the bias of the spring 229, there is free communication of large area under the lifted ball 217, between the inlet chamber portion 139' and the valve inlet.

The flow sensor 200 is also modified in this case, compared with the embodiment according to FIG. 1, and comprises a housing 202 with inlet and outlet openings 204 and 206 and also ducts 208, 209 via which the hoses 84 and 82 incorporated in the pilot hose 80 communicate with the chambers 133 and 133' of the blocking valve 220 under and over the piston portion 219, 219', respectively. The central portion of the flow sensor 200 is formed as a cylindrical chamber 203, downwardly defined by a ring or flange 205 with a central through opening of comparatively, large area. On the upper side of the flange 205, as seen in FIG. 3, there is a plate 207 with a throughgoing constriction orifice 209 coaxial with the opening in the flange 205. The plate 207 is displacable in the chamber 203 and is normally kept against the flange by a light spring 211, which in turn abuts against a spring seating 213 fixed in the housing 202 and provided with throughflow openings.

The valve means according to FIG. 3 is completely analogous in its function with the apparatus according to FIG. 1. For a lowering movement of the cylinder L, when the hydraulic medium thus flows through the blocking valve 220 from the inlet 14, 14' to the outlet 15, 15' and further through the hose 46 to the flow sensor 200, there occurs a pressure drop $\Delta p_1$ when the medium flows through the gap 225 and a pressure drop $\Delta p_2$ in the flow sensor 200 when the medium flows through the constriction orifice 209. The pressure drop $\Delta p_1$ across the space 225 obviously means that a higher pressure will prevail above the valve ball 217 of the closing means 218 than below it, so that the ball is subjected to a downwardly directed force. This is counteracted as before by the upwardly directed force which the pressure drop $\Delta p_2$ from the flow sensor 200 exerts on the piston slide 218' of the closing means. In completely analogy with the valve 120 according to FIG. 1, the pressure drops are matched such that the valve will remain in the open position and allow through flow, i.e. the cylinder L is allowed to carry out lowering movements with the maximum speed which the coacting constrictions of the blocking valve 220 and the flow sensor 200 allow. On the other hand, if a considerable leakage occurs in the hose 46, so that the volume flow through the flow sensor 200 decreases compared with the volume flow through the blocking valve 220, the pressure drop $\Delta p_2$ will be reduced to the value $\Delta p'_2$, see FIG. 2, and the piston slide 218' is no longer capable of holding the ball 217 in the open position shown in FIG. 3. The ball is displaced downward to sealing engagement with the seat 141, the valve thus completely blocking the outlet from the cylinder L and thereby preventing an uncontrollable dropping movement as has been described hereinbefore. The blocking movement naturally takes place even more quickly if the hose 46 were to rupture completely so that the pressure drop $\Delta p_2$ would become nil.

When there is a flow in the opposite direction through the hose 46, i.e. when the cylinder L is carrying out a working or lifting movement, the pressure drops in flow sensor 200 as well as in blocking valve 220 will be reversed, i.e. change sign. With regard to the flow sensor, see FIG. 3b, this means that the orifice plate 207 will be subjected to an upwardly directed force as seen in the figures, which overpowers the spring 211 and lifts the washer upwards to uncover the larger opening in the flange 205, whereby flow resistance is drastically reduced. Simultaneously the ball 217, incorporated in the closure means 218 of the blocking valve 220, is subjected to an upwardly directed force, see FIG. 3a, overcoming the spring 229 and lifting up the ball to an upper end position in the plug 231. Thus, the liquid can not only flow through the gap 225 but also up underneath the ball and out through the windows 234 in the sleeve 232 and away through the chamber 139 and passage 122. The flow resistance through the blocking valve is thus also reduced considerably when the flow is in this direction, analogous to the situation with the valve 120 according to FIG. 1. But neither in this case is the quickness of reaction of the valve means adversely effected for a possible conduit rupture while the flow is in the working direction, but similarly to the valve body 117, the ball 217 will be quickly taken down to its closing position if a rupture should occur under these conditions.

As a result of the valve arrangement according to the invention, shown in FIG. 3, in which the flow resistance in the blocking valve as well as in the flow sensor is reduced substantially for a flow in the working direction, i.e. when carrying out a lifting movement according to the chosen example, the pressure drops $\Delta p_1$ and $\Delta p_2$ in the opposite flow direction, i.e. during a lowering movement, can be chosen comparatively high, since they do not give rise to any notable constriction losses during the working or lifting movement. The speed of reaction of the valve to a conduit rupture can hereby be increased, since the closing speed of the blocking valve is in response to the prevailing pressure drop $\Delta p_1$ across the valve body or ball 217 at the moment of rupture. At the same time, the valve arrangement can be made to react for even smaller leakage (partial conduit rupture) than is otherwise possible, for example with the previous valve arrangement mentioned in the introduction, since the operative pressure drops $\Delta p_1$ and $\Delta p_2$ will be relatively large even for low flow speeds. In many types of hydraulic system a comparatively high pressure drop in a direction counter to the working direction, e.g. in the implement lowering movement on a hydraulic machine, is acceptable and even desirable since the lowering speed can otherwise be too high and cause damage to equipment or load. In the working direction on the other hand, i.e. the lifting movement in the chosen example, the lowest possible pressure drop in the valve arrangement is striven for. The valve arrangement according to the invention is well suited to these operating conditions and to provides a safety valve, such as a hose rupture valve, which has greater selectivity and speed of reaction than the previously known valve arrangement mentioned in the introduction.

The valve arrangement shown in FIG. 3 can be further simplified, as is very schematically illustrated in FIG. 4, which shows a modified blocking view 320. The simplification is that appart from the ball 217 a still further valve ball 319 is incorporated in the closure means 118 to replace the piston portion 219, 219' of the piston slide 218' according to FIG. 3. This ball 319 is accomodated with a sliding fit in a bore which is separated by the ball into an upper and a lower chamber 333' and 333, corresponding to the chambers 133' and 133 according to FIG. 3. The ball 319 can be similar or larger than the ball 217 and be urged by a spring 350 corresponding to the spring 150. The upper spindle 221 of the piston slide 218' is replaced by a free pin or push rod 321, having a small diameter and movable in a similar guide in the housing as the spindle 221. By means of the push rod, both balls 217 and 319 can interact in exactly the same was as the ball 217 and the piston portion 219, 219' interact in the embodiment according to FIG. 3. The closure means of the blocking valve will in this case consist of two balls with an intermediate, axially movable push rod. The flow sensor 200 is however the same as in the embodiment according to FIG. 3.

The extra ball 319 has only a line seal with the surrounding wall of the bore 333', 333, and will thus not completely sealingly separate the upper chamber 333' from the lower chamber 333. Normally, there is thus a certain flow past the ball 319 from the lower to the upper chamber all the time, which is actually to advantage, since hydraulic fluid in the pilot hose 80 will thus be continually replaced and is prevented from stagnating in the hose at the risk of becoming viscous at low outside temperatures.

FIGS. 5 and 6 are intended summarily to illustrate the functional principle of the invention, the simplified embodiment according to FIG. 4 having been chosen for exemplification.

FIG. 4 thus illustrates a normal flow through the blocking valve 320 and further out through the hose 46. As described hereinbefore, an upwardly directed force holding the valve ball 217 open is created by the pressure drop over the flow sensor 200, this force continually balancing the downwardly directed closing force on the same ball caused by the pressure drop over the ball itself created by the medium flowing through the blocking valve past the ball and through the gap 225. Now assume that a rupture or a severe leak occurs in the hose 46, see FIG. 5. As described above, the balance of forces on the ball 217 is immediately disturbed, the downwardly closing force taking the upper hand, causing the ball to move immediately towards its seat 141 to block the flow.

FIG. 6 finally illustrates the free flow prevailing when the flow is in the opposite direction, i.e. from the flow sensor 200 through the hose 46, and out through the blocking valve 320. In this case both flow sensor and blocking valve act as ordinary non-return valves, whereby the orifice plate 207 of the flow sensor is lifted from its seat on one hand, and on the other hand the valve ball 217 of the blocking valve is thrust upward and uncovers the port openings 234 in its guiding sleeve 232. Accordingly, the result is a greatly reduced flow resistance through the system for flows in this direction. It is once again pointed out that the protective effect according to FIG. 5 still remains, since a rupture or severe leak in the hose 46 immediately causes a reversal of the flow, at least through the blocking valve 320, and blocing takes place in the manner described hereinbefore.

The described valve arrangements only represent examples of the practical application of the invention, and it is naturally not limited to these embodiments but can be modified in further respects within the purview of the idea on which the invention is founded.

I claim:

1. A valve arrangement for automatically stopping the flow of a medium through a conduit section on the occurrence of a rupture or leak in the section, the arrangement comprising a closing or blocking valve including a movable closure means mounted at the inlet of the conduit section, said valve normally being open and offering the medium flowing therethrough a resistance resulting in a first pressure drop ($\Delta p_1$) across the valve is response to the size of the flow, said first pressure drop being arranged to actuate the closure means for closure thereof; and a flow sensing means mounted at the outlet of the conduit section, including, for example, an orifice plate or venturi constriction known per se, between the inlet and outlet sides of which the medium flowing therethrough generates a second pressure drop ($\Delta p_2$) in response to the size of the flow, this second pressure drop being arranged to actuate the said closure means in the opposite direction to that of closure, the improvement wherein the closure means includes two parts, each movable in relation to the other and actuated by the said pressure drops ($\Delta p_1$, $\Delta p_2$), the first part consisting of a blocking body arranged for moving towards the closure position by the first pressure drop ($\Delta p_1$) across the blocking valve for blocking the flow through the valve when in said closure position, while the second part consists of a servo body arranged for actuation by the second pressure drop ($\Delta p_2$) across the flow sensing means to thereby in turn act on the blocking body to counteract its movement towards the closure position.

2. A valve arrangement as claimed in claim 1, in which the blocking body of the closure means coacts with a valve seat in the blocking valve to assume its closure position, the improvement wherein the blocking body, when there is a flow through the conduit section in the opposite direction, i.e. from the outlet of the section to its inlet, is arranged to be lifted up by the flowing medium from the valve seat independent of the coacting servo body, to allow free flow through the blocking valve in this direction.

3. A valve arrangement as claimed in claim 2, wherein the blocking body of the closure means consists of a valve ball coacting with the valve seat, the ball being kept lifted out of the seat with the aid of a thrust means to allow normal flow through the valve from the inlet to the outlet of the conduit section, whereby the servo body is slidably accommodated in a chamber which is separated by the body into two parts in communication respectively with the inlet side and outlet side of the flow sensing means so that the second pressure drop ($\Delta p_2$) across the flow sensing means actuates the servo body for keeping the valve ball raised.

4. A valve arrangement as claimed in claim 3, wherein the said servo body consists of a second valve ball coacting through the intermediary of a movable pushrod or pin with the first-mentioned valve ball forming the blocking body.

5. A valve arrangement as claimed in claim 1, wherein the flow sensing means comprises a movable platelike member having a constriction orifice were the said second pressure drop ($\Delta p_2$) is generated when the medium flows from the inlet to the outlet of the conduit section, the platelike member being also arranged to uncover an opening offering considerably less flow resistance than said constriction orifice when the medium flows in the oppositedirection.

6. A valve arrangement as claimed in claim 1, wherein the second pressure drop ($\Delta p_2$) across the flow sensing means for actuating the servo body of the closure means is transferred by a pilot line comprising dual hoses, each hose communicating with one side of the sensing means, the hoses being arranged one inside the other.

* * * * *